United States Patent [19]

Miller

[11] Patent Number: 4,930,152
[45] Date of Patent: May 29, 1990

[54] CALL RETURN TELEPHONE SERVICE

[75] Inventor: Patrick A. Miller, Red Bank, N.J.

[73] Assignee: Bell Communications Research, Inc., Livingston, N.J.

[21] Appl. No.: 238,738

[22] Filed: Aug. 31, 1988

[51] Int. Cl.⁵ ............................................. H04M 3/50
[52] U.S. Cl. ..................................... 379/214; 379/89; 379/67
[58] Field of Search ...................... 379/88, 89, 67, 84, 379/68, 214, 213, 207, 201

[56] References Cited

U.S. PATENT DOCUMENTS

| | | | |
|---|---|---|---|
| 4,304,968 | 12/1981 | Klausner et al. | 379/68 |
| 4,313,035 | 1/1982 | Jordan et al. | 379/207 |
| 4,327,251 | 4/1982 | Fomenko et al. | 379/76 |
| 4,476,349 | 10/1984 | Cottrell et al. | 379/214 |
| 4,766,604 | 8/1988 | Axberg | 379/67 |
| 4,792,967 | 12/1988 | Ladd et al. | 379/67 |

FOREIGN PATENT DOCUMENTS 0090451  5/1984  Japan .................................. 379/89

Primary Examiner—James L. Dwyer
Attorney, Agent, or Firm—James W. Falk; Lionel N. White

[57] ABSTRACT

A process for controlling a telephone switching system provides a telephone customer access from any dual-tone multi-frequency (DTMF) telephone set to a memory-stored list of calls which the customer had previously been unable to answer at the customer's registered telephone station. A party receiving no answer when placing a call to the customer's station, whether due to a busy line or absence of the customer, is advised by a recorded message to enter, via the DTMF keyboard, the caller's phone number. The number received in the response is then entered on the customer's callback list, which may later be accessed by the customer from the customer's station, or from any DTMF set. Upon entering proper identification, the customer is advised of the number, and other identity, of any of the calling parties on the callback list. The customer may signal for the automatic placement of a return call to, or may delete or hold, any of such listed numbers. The sytem also provides customer access from the remote set to other customer-subscribed telephone services.

15 Claims, 5 Drawing Sheets

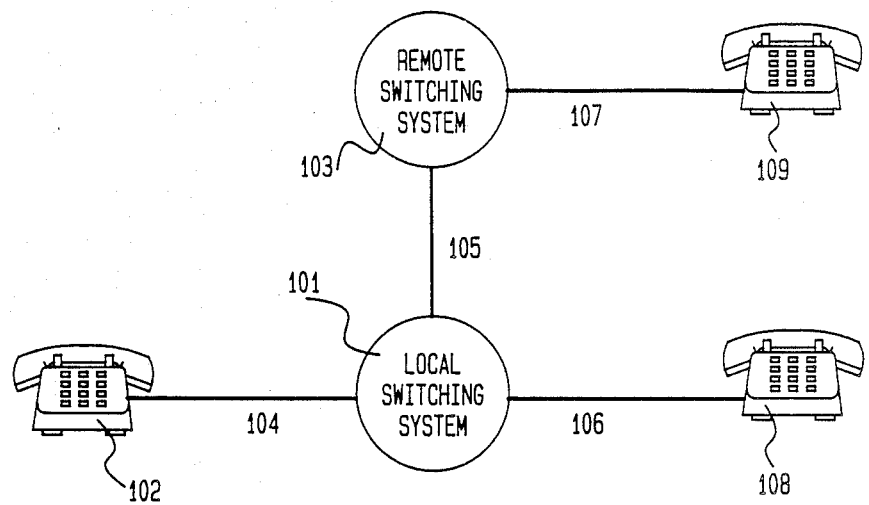

| (601) CUSTOMER STATION NUMBER |
| (602) NUMBER OF CALLBACK LISTS |

| | |
|---|---|
| (611) CUSTOMER NAME, LIST 1 | (621) CUSTOMER NAME, LIST 2 |
| (612) PERSONAL I.D. NUMBER, LIST 1 | (622) PERSONAL I.D. NUMBER, LIST 2 |
| (613) NUMBER OF CALLBACK NUMBERS, LIST 1 | (623) NUMBER OF CALLBACK NUMBERS, LIST 2 |
| (614) FIRST CALLBACK NUMBER, LIST 1 | (624) FIRST CALLBACK NUMBER, LIST 2 |
| (615) SECOND CALLBACK NUMBER, LIST 1 | (625) SECOND CALLBACK NUMBER, LIST 2 |
| (616) THIRD CALLBACK NUMBER, LIST 1 | (626) THIRD CALLBACK NUMBER, LIST 2 |
| . . . | . . . |

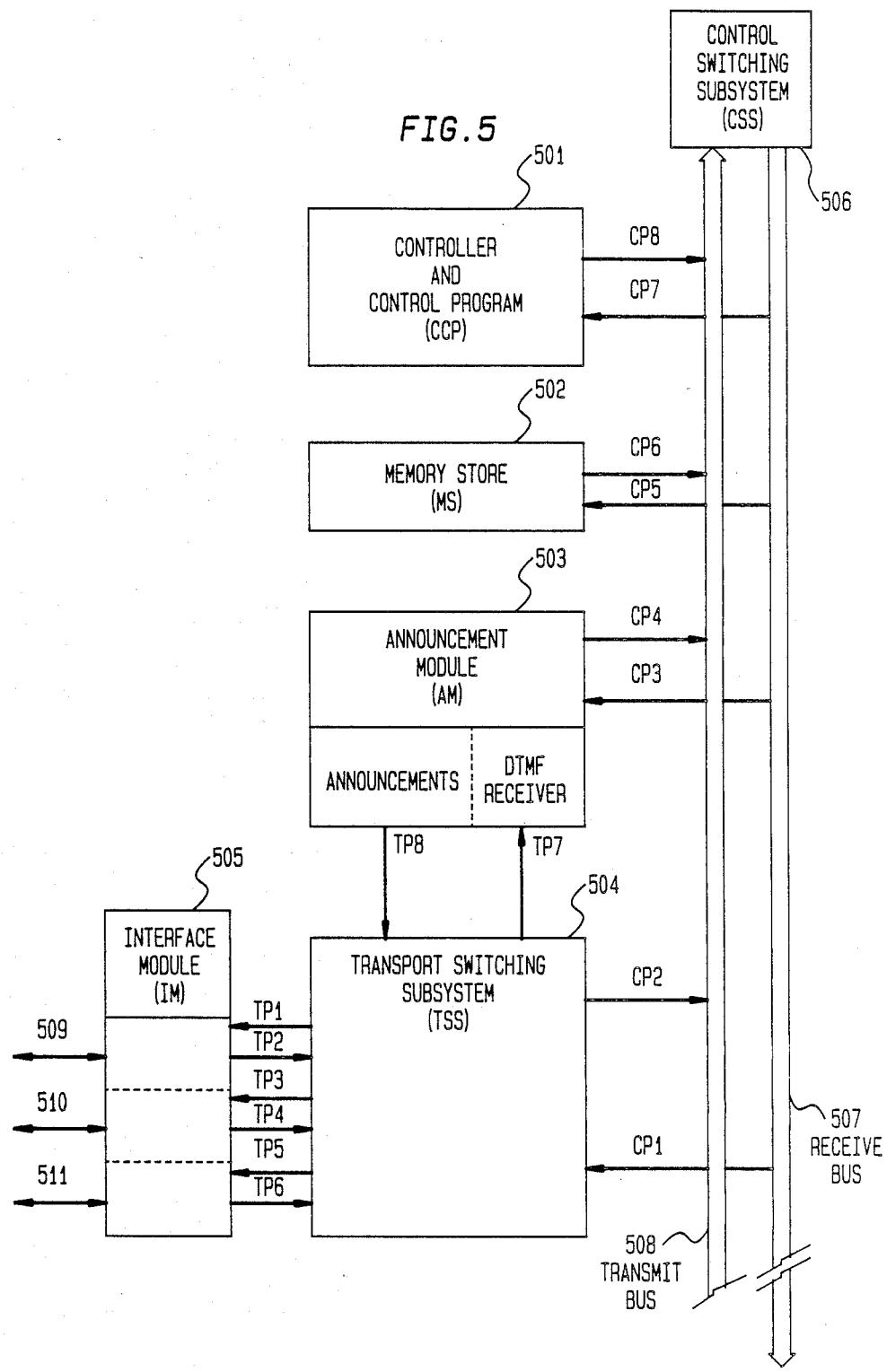

CALL RETURN TELEPHONE SERVICE

BACKGROUND OF THE INVENTION

A significant number of telephone calls go unanswered, with their intended purpose defeated, as a result of the called party's either being not available to answer or being busy on another call. Although a number of remedies for this problem have been proposed, for example, the use of answering service bureaus or private answering machines, or the implementation of customized call-waiting telephone service, these have not proven particularly satisfactory due to cost, inadequate response time, or general inconvenience.

Response to a callback request message received on a common answering machine recording, for instance, usually requires an intermediate transcription of the caller's number with subsequent individual entry of that number by the customer. More expensive and sophisticated answering machines, such as described by Klausner et al., U.S. Pat. No. 4,304,968, provide means for digitally recording a phone number input by an unanswered caller, to be later displayed or automatically dialed, at the option of the called party; however, such equipment is permanently affixed to a user's phone line and can only be utilized at the user's premises.

There has also been proposed an automatic callback service within the customer's local telephone switching system which would provide for the switch, upon the customer's requesting signal, to place a call to the memory-stored number of the party who had last called the customer's number. While this procedure eliminates some of the earlier-noted drawbacks of prior alternatives, it unfortunately introduces disadvantages of its own. Among these are the limitation of retained call identification to only the single most recent call, the lack of customer notification of the number that will be called by the system, and the lack of knowledge or consent on the part of the calling party with respect to retention of the number.

Each of the foregoing approaches requires, of course, that the called station be simply unattended, and not otherwise engaged as a busy line. Under the latter condition, call-waiting services provide some relief, but suffer from such undesirable aspects as persistent conversation interruption and lack of busy line awareness on the part of the calling party in the event of nonresponse by the called customer.

The need has thus long persisted for a system which can provide the called customer, and the calling party as well, with the ability, in the event of either an unattended or a previously engaged called phone station, to voluntarily implement options which will enable the completion of any number of calls which the customer was unable to answer over an extended span of time. The present invention now provides such a system.

SUMMARY OF THE INVENTION

In accordance with the service system of the present invention, the subscribing customer or an "outsider", i.e. a person not privy to the customer's access code, when placing a call to the customer's registered station, is provided with the opportunity to operate interactively with the local switching system so as to invoke a number of various stored programs which will enable that caller to record on a selected list a telephone number for later requested callback by the customer. The number listing, with other caller identification available from the telephone company database, as well as callback execution and other system functions, are accessible to the customer from any dual-tone multiple-frequency (DTMF) keyboard telephone set, thereby enabling the customer to utilize the system from locations other the customer's own registered station.

In operation, the system will prompt, by means of a prerecorded announcement, each caller who is unable to complete a calling connection with the customer, whether due to a busy line or absence of the customer, to add the caller's telephone number to the customer's callback list, or to a selected one of a number of lists if more than one person uses the customer's registered station, by entering that number on the caller's DTMF keyboard. If the caller elects to respond, the number entry will be made on the appropriate list and the listing optionally may be confirmed prior to caller disconnect. Otherwise, a normal disconnect will take place when the caller hangs up.

The customer may at any time access a station callback list by placing a call to the station, either from that station or some other DTMF telephone set. Initially appearing as any other caller, the customer will be prompted, if the call is not completed, to enter a telephone number, presumably for addition to a station callback list. Entry of the customer's own station number, which will be recognized as such from a routine comparison within the switch's memory, will instruct the system to arrange for delivery of caller information carried on the callback list. The caller will initially be prompted, by an appropriate recorded message, to provide positive identification, such as by entering a Personal Identification Number (PIN) on the DTMF keyboard. Verification of the PIN by memory comparison will then allow access to the relevant callback list.

A message based upon the data in the callback list file in the switch memory will then be delivered to the customer from the announcement synthesizer of the switch, informing the customer of each listed telephone number, along with personal identification of the user registered for that station if such information is available in the telephone company database. With each such announcement the customer is prompted to indicate an option, by keyboard entry, from among automatic callback to the number, nonimplementation of the number, or removal of the number from the list. After each callback conversation, the customer will be returned to the list announcements until all listed numbers have been reported.

Upon completion of the list reports, the system will return the customer to the point of initial access to the list with originally announced options to review all listed numbers, to add a number, or to access any one of other special services to which the customer may be subscribed. Selection of this latter option thus enables the customer to utilize such a special service while personally located at a remote station. For example, it allows the customer to call any number from a remote station with actual billing being made to the customer's own station account.

The system and procedures of this invention thus provide a subscribing customer with the opportunity for allowing an unsuccessful calling party the option of leaving a request for a return call, while providing the customer with the option of returning the call at any subsequent time, or not at all. An additional option is also provided the customer for accessing other of the customer's subscribed services from a remote station.

THE DRAWING

The present invention will hereafter be described with reference to the accompanying drawing of which:

FIG. 1 is a representation of a typical telephone network in which the present invention may be implemented;

FIG. 5 is a block diagram of elements of a local system switch which are employed to implement the present invention; and FIG. 6 is a representative partial listing of typical data entries in a memory store element of a switch as diagrammed in FIG. 5.

DESCRIPTION OF THE INVENTION

Figure 2:
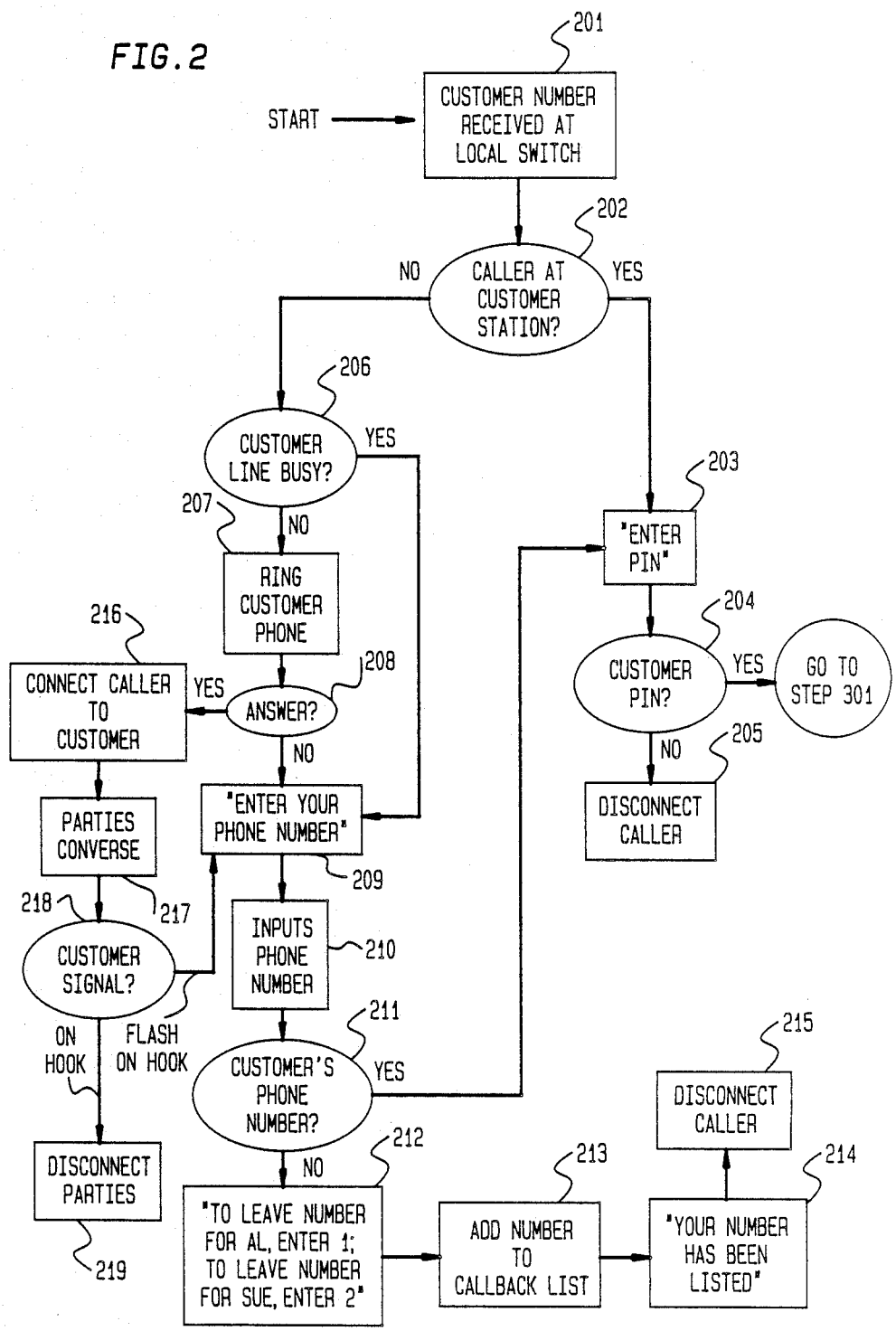
FIG. 2 is a flow chart of the present invention during the processing of a call from the customer or an "outsider"

A simplified representation of a typical telephone network is depicted in FIG. 1 as comprising a local switching system 101 which serves the customer station 102 over customer loop 104, as well as serving other local stations, such as party station 108 accessed over its loop 106. The network may further comprise a remote station 109 served over. remote loop 107 by a remote switching system 103 which communicates with local switching system 101 over trunk 105.

In the following description, local system 101 represents the switch in which the present invention is implemented for the customer of the service, and may typically be a No. 1/1A ESS analog switching system manufactured by AT&T Technologies, or a digital switching system, such as the DMS-100 system manufactured by Northern Telecom, Inc., or the No. 5 ESS switching system of AT&T Technologies. Whatever equipment may actually be employed as local switching system 101, the functional elements utilized in the processing of the present call return service will generally be such as those shown in FIG. 5.

Normal Call Operation

The normal operation of the switching system during the successful completion of a call to the customer is little changed from prior practices, and may be seen with reference to FIGS. 1, 2, and 5. Thus, while the customer, i.e. a subscriber to the service of the instant invention, is present at the registered station 102, an incoming call placed, for example, by a local party at station 108 would be processed in the following manner.

As depicted at step 201, the customer's station number has been communicated from calling station 108, in the usual manner via local loop 106, to switching system 101. Loop 106 thus appears, for instance, at position 509 of the switch's Interface Module (IM) 505. Further in this normal procedure, the digits of the customer's number and the caller's connection appearance position, i.e. 509, have been delivered to the switching system',s Controller and Control Program (CCP) 501. At this point, enquiry step 202 of the present service is implemented in CCP 501 by a comparison of the appearance position of the local line, i.e. that of the customer identified by the collected digits, with the caller's position 509. Since, as assumed in this example, the call originated at another station, the customer's appearance position, such as at 510, is different from that of the caller, and the system instructs the switch to begin a normal call connection procedure.

Initial enquiry step 206 is effected in CCP 501 to determine whether or not the customer's line is busy. If it is not, CCP 501 directs Transport Switching System (TSS) 504, by means of an instruction placed on Control Path 8 (CP8) for delivery via transmit bus 508, Control Switching Subsystem (CSS) 506, receive bus 507, and CP1, to apply ringing power to the customer's line for a predetermined number of ringing cycles, and to connect the caller to an audible ringing announcement from Announcement Module (AM) 503, via Transport Path 8 (TP8) and TP1. If, during the ringing cycle, enquiry step 208 confirms an answering response on the customer's line, TSS 504 so informs CCP 501, over CSS 506 control bus system via control paths CP2 and CP7, and in turn receives instruction from CCP 501 to connect the caller to the customer's line with transport path connections TP2:TP3 and TP4:TP1, as indicated at action step 216 in the process.

A conversation between the parties ensues, at step 217, until such time as TSS 504 detects, at step 218, a switch-hook signal from the customer, and informs CCP 501 of the state of such signal. Assuming a simple on-hook signal, TSS 504 is instructed by CCP 501 to disconnect both parties, at step 219, thereby returning both the customer,s line 510 and the caller's access 509 to idle status. In this manner the service of the invention provides normal communication connection between a caller and a customer who is available to take the call. Beyond such routine operation, however, the system performs the following optional services which distinguish its unique capabilities.

Callback List Input

The first such service provides the customer with the means by which a caller may be accommodated in the event of the customer's being engaged with a previous call, or simply being absent from the station or otherwise unable to accept the call. Referring to FIG. 2, this latter condition would become apparent at enquiry step 208 when the prescribed number of ringing cycles are completed without an answer at the customer's line, while the former would be established at step 206. In either event, TSS 504 informs CCP 501 of the condition and, in turn, is instructed to connect the caller's line 509 to the Announcements and DTMF Receiver elements, respectively, of AM 503, via transport path connections TP8:TP1 and TP2:TP7. Upon receiving from TSS 504 confirmation of the success of the instructed connections, CCP 501 instructs AM 503, via CP3, to transmit to the caller's line 509 a stored announcement requesting the caller to enter the caller's phone number. While for the sake of brevity in the drawing the announced message appears at step 209 as "Enter your phone number", it could be any appropriate statement, such as one including the identification of the called station by number or otherwise, requesting the identity of the caller by way of a telephone instrument DTMF keypad number input. Although not specifically noted in the drawing, it should be understood that an on-hook response at this point, or failure of response within a predetermined period, would result in a normal disconnect of caller's line 509.

Upon the caller's entry of the requested information, at step 210, the digits collected in the DTMF receiver element of AM 503 are returned, via control paths CP4, CP7, to CCP 501 where they are compared, at step 211, with those of the customer's station phone number. This comparison, intended to distinguish between an "outsider" call and one from the customer desiring retrieving access to the callback list, confirms, in the present example, that the caller is someone other than the customer or a person associated with the customer's station, such as member of the family or business group. This identification establishes the caller as one who is allowed only input access to the customer,s callback list, and initiates a request by CCP 501, via control paths CP8, CP5, for Memory Store 502 to retrieve service data, as depicted in FIG. 6, relating to the customer. Such data, as noted, will include an indication of the number of individuals, e.g. family members, authorized to utilize the service, and a list of their respective names as holders of separate callback lists.

The name data stored in MS 502, for example at locations 611, 621 assuming a two-person customer station, are directed by CCP 501 to AM 503 where they will be pronounced as identifiers in a synthesized or recorded announcement, such as at step 212, requesting the caller to designate, by entry of the appropriate digit, the callback list upon which the caller's previously specified telephone number is to be added. Once again, it will be understood that the caller may hang up at this or any previous point in the process to thereby terminate the call, in the usual manner, without establishing a record of the caller's identity.

Assuming that the caller elects to designate a callback list as requested, the digit input is collected from AM 503 by CCP 501 which in turn directs MS 502, at step 213, to transfer the caller's telephone number from a temporary memory buffer to more permanent storage on the specified list, for example at memory location 616. At the same time there may optionally be delivered for storage at this location with the caller,s number a statement of the current time and date as fetched from the system clock. CCP 501 then directs MS 502 to increment the callback number data at location 613, and instructs AM 503 to return to caller a confirming announcement, as at step 214. The process of this service routine having been completed, CCP 501 directs TSS 504 to terminate the call by removing the various connections and returning line 509 to idle status.

The present invention provides a further option for the "outside" caller in the event that the called customer's station instrument is answered by a person other than specific customer party sought. Ascertaining from the initial conversation that the calling party desires to leave a callback number for one of the customer station members, the person at the customer station need only provide a "flash" signal, either by a momentary depression of the instrument hook or by use of a dedicated instrument pushbutton, followed immediately by an on-hook termination of the conversation. The ensuing operation of the switching system would then proceed from step 218 of FIG. 2 to begin the sequence which provides the caller access to input to the desired customer's callback list.

Thus, referring to FIG. 5, TSS 504 notifies CCP 501 of the customer station signal at step 218, and is in turn instructed by CCP 501 to disconnect the parties by removing transport connection paths TP2:TP3 and TP4:TP1, and to transfer the caller to AM 503 by establishing connections via path TP2:TP7 and TP8:TP1. The system then initiates the announcement at step 209, and controls the procedure through disconnect at step 215 as previously described.

Yet another eventuality is accommodated in the present system in that a customer may call in to the customer station for the purpose of adding a phone number to that customer's list, such as for later recall. In this circumstance, the caller, in response to instruction 209, would input, at step 210, the customer station phone number which is then compared, at step 211, with the number of the customer's station in the manner noted above. A match in these numbers indicates that the caller is claiming to be the customer, and initiates a verification procedure from step 203.

This procedure begins with the instruction from CCP 501 to TSS 504, via control paths CP 8:CP1, which effects the connection of the caller to AM 503 via paths TP8:TP1 and TP2:TP7. Upon successful completion of the connection, CCP 501 directs AM 503 to request the caller, by way of an announcement on path TP8:TP1, to enter a "personal identification number" (PIN). The response input through the caller's keypad is returned, via transport paths TP2:TP7, to AM 503 which in turn forwards the collected digits to CCP 501. At step 204, CCP 501 instructs MS 502 to locate the one or more PINs, as at positions 612 and 622, associated with the customer's station, and to return those stored numbers to CCP 501, via control paths CP6:CP7, for comparison with the PIN provided by the caller. Failing a match, CCP 501 will instruct TSS 504 to terminate the connections at step 205.

Figure 3:
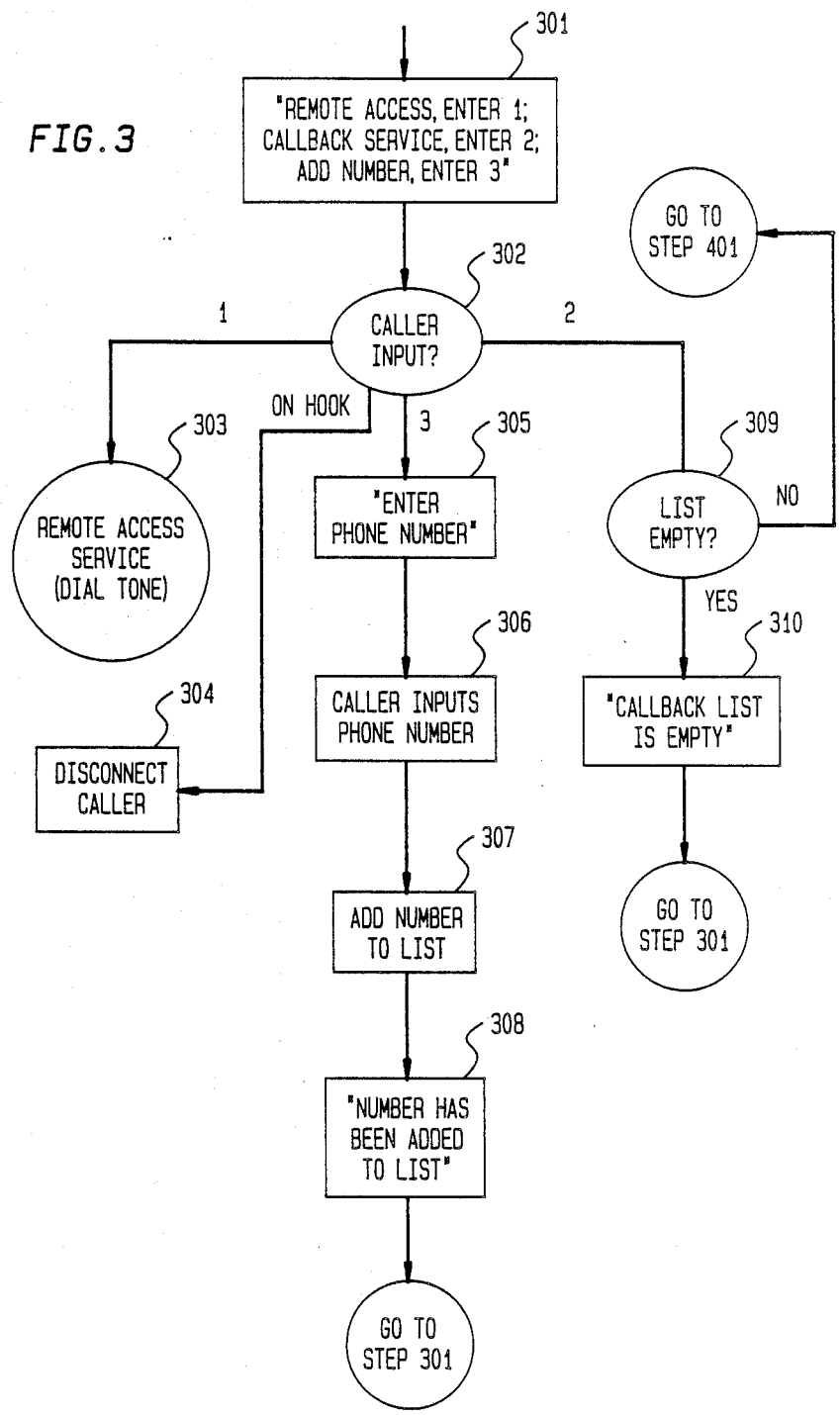
FIG. 3 is a flow chart of the present invention during the processing of an input access call from the customer.
Figure 4:
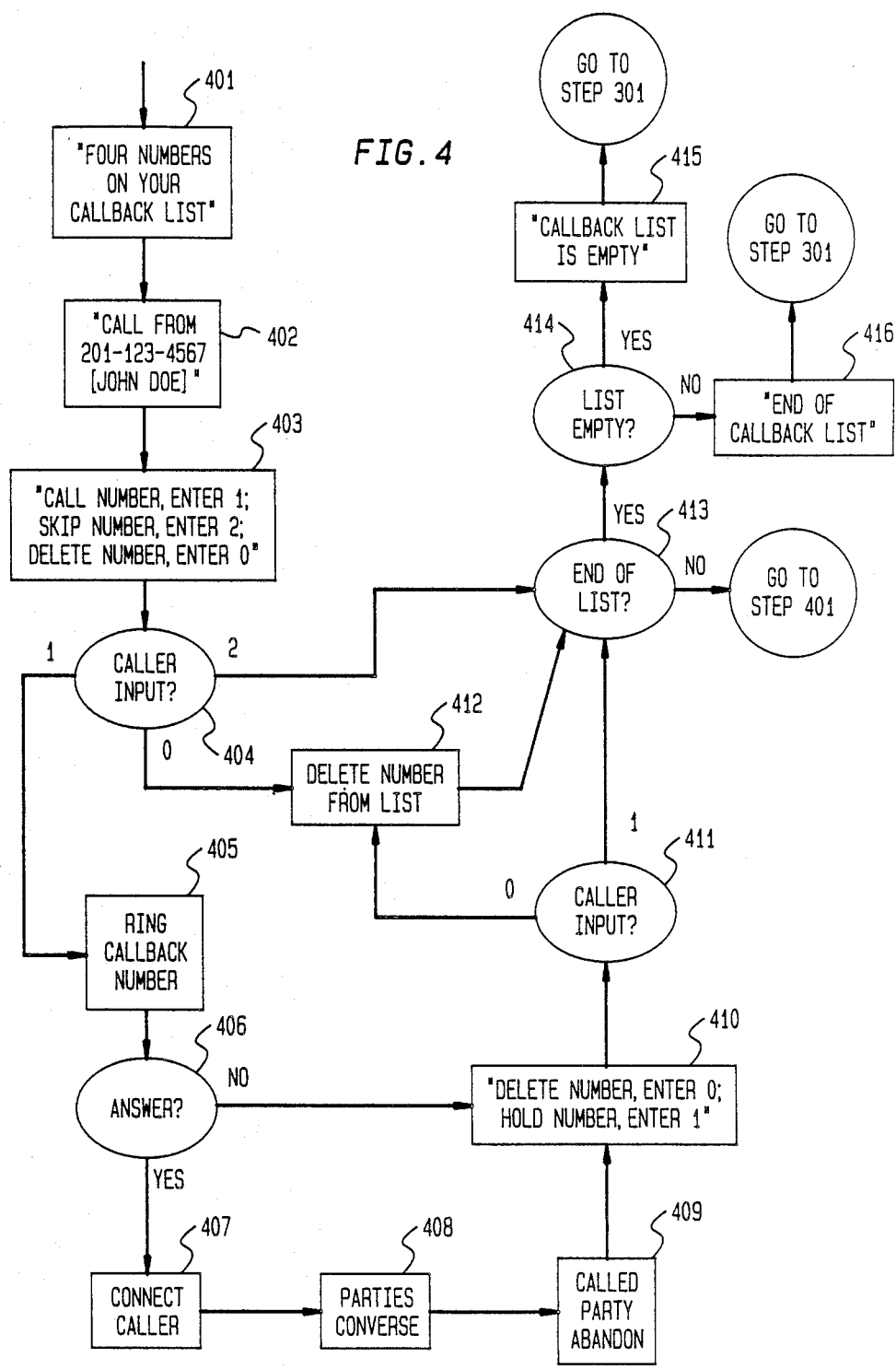
FIG. 4 is a flow chart of the present invention during the processing of a recovery access call from the customer.

On the other hand, a match of the input number with the PIN recorded at location 622, for instance, verifies the caller as that identified registered user of the customer's station. CCP 501 thereupon authorizes access to the specified callback list for that station and initiates, at step 301, the service routines depicted in FIG. 3. Here, AM 503 is directed by CCP 501 to announce the list of options available to the customer, and to return the caller's response digit. In the present example it has been assumed that the caller desires merely to list a phone number on the callback list; therefore, the caller's responding input of the digit "3" is identified by CCP 501, at step 302, and the add-number routine is begun.

Utilizing the appropriate control and transport paths noted earlier, CCP 501 directs AM 503 to announce instruction 305, collect the digits input by the caller at 306, and return the collected digits. Upon verifying the input digits as a legitimate telephone number, CCP 501 transfers that number to MS 502 for storage, e.g. at location 626, on the identified customer's list, as at step 307, and directs that MS 502 increment, at location 623, the total number of callbacks listed. AM 503 announces confirmation of the listing, as at step 308, and CCP 501 loops the routine back to step 301 for additional instructions from the customer/caller. At step 302, or at any prior time, the caller may terminate the session by going on-hook at the calling phone.

Callback List Retrieval

The foregoing procedures relate, as has been indicated, to the various implementations of the present invention that pertain to the entry of a caller's phone number, as a deliberate act of the caller, upon an established list specifically associated with the called customer. The following description is directed to the aspects of the instant process that provide for the recovery and utilization of such listed phone numbers by the customer party to whom these deposited messages are intended.

Whereas the callback lists are available to both customers and outsiders for the purpose of entering phone numbers for later recall, access to such a list is limited to the respective customer/user whose PIN is identified with that list in the data maintain in MS 502 of the system. One manner of achieving such access has been related above in a circumstance where the customer calls the customer's phone from another location for the limited purpose of adding a number to the callback list. For the more commonly employed purpose of reviewing numbers on the list, with immediate callback if desired, access to the list is effected by means of substantially the same initial steps set out in FIG. 2, through the customer PIN entry to actuate step 301. It will be noted that this access can be completed regardless of whether the customer's station is busy, is answered, or is unattended. As in the procedure steps earlier described with respect to an outside caller, each of these circumstances leads to the request at step 209 for entry of an identifying phone number which in this event, being the customer's own number, will trigger the callback list access verification of step 203.

Another often employed access by the customer to the callback list originates at the customer's station, such as when the customer returns after an absence. The procedure implemented for such access was noted earlier with respect to the ordinary set-up of an incoming call, and comprises, in this instance, the affirmative comparison, at step 202, of the caller's connection appearance position, for instance 509, at IM 505 with the same appearance position of the called station, i.e. the customer's own number as identified by the collected digits delivered to CCP 501. Verification step 203 is thereupon called by CCP 501 directly without further action by the customer/caller.

Identification of the caller, at step 204, as, for instance, the first of a number of persons authorized to use the customer's station, causes CCP 501 to direct the announcement at step 301 requesting the selection of a service option. Since the customer desires to review the callback list, option number "2" is input, resulting in the examination by CCP 501 of the data in the PIN-specified list at location 613 in MS 502 to determine, at step 309, whether there are any numbers being held for customer review. If that location registers a "zero", CCP 501 directs the advising announcement at step 310 to be input from AM 503, and loops the process back to step 301 for the usual option selection. At this point the customer would likely terminate the session by going on-hook.

In the event that there were caller responses input to the customer's list, the examination, at step 309, of MS 502 location 613 would reveal a number other than zero and cause CCP 501 to direct the routine to step 401 where AM 503 is instructed to insert that number in the advising announcement delivered to the customer via paths TP8:TP1. CCP 501 then begins the callback review procedure by fetching the phone number, with associated time and date information, from the first data location 614 for insertion into announcement 402 from AM 503. At this time, CCP 501 may also fetch from an external telephone company database additional information, such as the caller's name, for inclusion in the list item announcement.

Option announcement 403 from AM 503 then follows requesting the customer's selection of action to place a call to the announced phone number, skip the number, or delete the number from the list. The returned customer instruction digit, e.g. a "1" to effect immediate callback, is determined, at step 404, by CCP 501 which then directs the disconnection of AM 503 from the customer, and initiates an attempt, according to the usual prior art procedure, to effect a call set-up, at step 405, with the callback number. When CCP 501 notes, at step 406, the answer of the called party, for instance at position 511 of IM 505, TSS 504 is instructed to connect the caller, at step 407, with the customer, via paths TP2:TP5 and TP6:TP1, for a normal conversation, as at step 408.

Upon termination of the conversation, at step 409, with called party disconnect, CCP 501 directs TSS 504 to disconnect the existing transport paths, and to reestablish the path connections between the customer and AM 503. At this point, as in the event where the attempted callback was unsuccessful after a prescribed number of ringing cycles, AM 503 is instructed by CCP 501 to prompt the customer with announcement 410 to select a disposition of the current callback number. An indication, at step 411, that the customer desires to hold the number, presumably for later recall, will cause CCP 501 to proceed directly to an examination, at step 413, of the following callback number locations, i.e. 615 et seq., in MS 502 to determine if additional numbers are present on the list.

If, however, as where such an indication is made in response to selection request 403, the customer indicates, with a "zero" input, a desire to delete the current phone number, CCP 501 will instruct MS 502 to delete, at step 412, the data from location 614, and to decrement by one the listed number count at location 602. Thereupon, as in response to a customer indication, at step 404, of a desire to skip the current listed number, CCP 501 proceeds to a list examination at step 413.

A determination that another phone number is listed beyond the location of that last fetched causes CCP 501 to loop the process to step 401 for announcement of the callback list count and commencement of the fetching and announcing of the next listed number. In the event that there are no numbers beyond the last to have been announced, CCP 501 directs MS 502 to return the callback list count from location 613 in order to ascertain, at step 414, if any numbers remain on the list. The appropriate announcement 415 or 416 is delivered to the customer from AM 503, and the process loops back to step 301 for prompting instructional input by the customer. Having reviewed all numbers then on the callback list, the customer may terminate the session by simply going on-hook at step 302.

Remote Access Service

As an additional option to the customer who has obtained verified access to the callback list, presumably from an outside station, there may be requested, at step 302, access to the special telephone system services specifically associated with the customer's own station. Upon selection of this remote access service, CCP 501 directs AM 503 to present the customer with dial tone, and subsequently collects input keypad digits and characters, as in the event of application of a mnemonic speed dialing service, and effects processing of the call as though the same were originating from the customer's station. Other requests for service input by the customer from the remote location will likewise be processed where necessary with identification data associated with the customer station. Thus a long distance call, for example, may be charged directly to the customer's billing account, even though placed from the remote station.

Other embodiments of the invention will be apparent from the foregoing description to those of ordinary skill in the art, and such embodiments are likewise to be considered within the scope of the invention as set out in the appended claims.

What is claimed is:

1. A method of controlling a local telephone switch to provide a party calling to a subscribing customer station served by said switch the capability of depositing in said switch caller identification retrievable by said subscribing customer at any telephone station, said method comprising the steps of:
   (a) designating a location in memory means of said switch to be associated with a personal identification number (PIN) specific to said customer;
   (b) enabling said switch, in the event of a busy or no-answer condition at said customer station, to accept a predetermined command signal input at the telephone station of said calling party specifying said memory means location; and (c) directing to storage in said memory means location so specified a caller identifier input at said calling party station.

2. A method of controlling a local telephone switch to provide a subscribing customer served by said switch the capability of retrieving at any telephone station caller identification deposited in said switch by a caller to the station of said customer, said method comprising the steps of:
   (a) designating a location in memory means of said switch to be associated with a personal identification number (PIN) specific to said customer;
   (b) directing to storage in said memory means location a first party caller identifier input at the telephone station of a first party calling said customer station;
   (c) enabling said switch, upon input of said PIN at the telephone station of a second party calling said customer station, to accept command signal input at said second calling party station;
   (d) retrieving said first party caller identifier from said memory means location upon input of a predetermined command signal at said second calling party station;
   (e) directing said first party caller identifier to announcement means for translation into an aurally-receptive message identifying said first calling party; and
   (f) effecting aural delivery of said message from said announcement means to said second calling party.

3. A method of providing call return service to a subscribing customer served by a local telephone switch comprising memory means and aural message announcement means, said method comprising:
   (a) providing in said memory means a location associated with a personal identification number (PIN) specific to said customer;
   (b) providing to a first party calling the station of said customer, in the event of a busy or no-answer condition at said customer station, input access to said memory means location;
   (c) recording in said memory means location a first party identifier input at said first party station;
   (d) verifying as said customer a second party calling said customer station and inputting said PIN at the station of said second party; and
   (e) delivering aurally to said calling customer from said message announcement means a message conditioned by said first party identifier to identify said first calling party.

4. The method according to claim 3 wherein said first party input access is provided in response to first party input of a prescribed request signal, and which further comprises the step of previously announcing to said first party an aural message specifying said prescribed signal.

5. The method according to claim 3 which further comprises the step of deleting said first party identifier from said memory means location in response to customer input of a prescribed signal at said second station subsequent to said identifying message announcement.

6. The method according to claim 5 which further comprises the step of previously announcing to said customer an aural message specifying said prescribed signal.

7. The method according to claim 3 wherein said first party identifier is the telephone number of a station designated by said first calling party, and which further comprises the step of attempting to establish in response to customer input of a prescribed signal at said second station a calling connection with said first party designated station.

8. The method according to claim 7 which further comprises the step of previously announcing to said customer an aural message specifying said prescribed signal.

9. The method according to claim 7 which further comprises the step of deleting said first party identifier from said memory means location in response to customer input of a prescribed signal at said second station subsequent to said calling connection attempt.

10. The method according to claim 3 wherein identifiers of a plurality of parties are recorded in said memory means location, and which further comprises the step of delivering aurally to said customer in response to customer input of a prescribed signal at said second station a message conditioned by another of said identifiers to identify another of said plurality of parties.

11. The method according to claim 10 which further comprises the step of providing to said customer, subsequent to each identifying announcement message, an aural message indicating the status of identifiers recorded in said memory means location.

12. A method of controlling a local telephone switch comprising memory and aural message announcement means to provide a subscribing customer access from any telephone station to specialized telephone call service associated with the customer telephone station served by said switch, said method comprising;
   (a) storing in said memory a personal identification number (PIN) specific to said customer;
   (b) storing in said memory an identifier of said customer station;
   (c) acquiring an identifier of a party calling said customer station;
   (d) retrieving from said memory said customer station identifier;

(e) comparing said customer station identifier with said calling party identifier;
(f) delivering aurally to said calling party from said message announcement means, in the event of a matching comparison of said identifiers, a request for the inputting of a PIN at the station of said calling party;
(g) retrieving from said memory said customer-specific PIN;
(h) comparing said customer-specific PIN with said calling party PIN; and
(i) providing said calling party, in the event of a matching comparison of PINs, access to said specialized service.

13. The method according to claim 12 wherein:

(a) said customer station identifier is the position of said customer station connection appearance at said switch; and
(b) said calling party identifier is the position of said calling party connection appearance at said switch.

14. The method according to claim 12 wherein said customer station identifier is the telephone number of said customer station, and which further comprises the step of aurally delivering to said calling party from said announcement means a message requesting input of a telephone number identifier associated with said calling party.

15. The method according to claim 14 wherein said requesting message delivery is initiated by a hookflash and disconnect signal at said customer station.

* * * * *